United States Patent
Piccinino, Jr. et al.

(10) Patent No.: US 6,854,494 B2
(45) Date of Patent: Feb. 15, 2005

(54) CUP AND PROBE ASSEMBLY FOR USE IN A VALVE SYSTEM FOR TRANSFERRING A LIQUID BETWEEN TWO SOURCES

(75) Inventors: Ralph L. Piccinino, Jr., Rush, NY (US); Clyde L. Fetterman, Webster, NY (US); Kevin H. Blakely, Rochester, NY (US); Martin L. Slade, Hemlock, NY (US)

(73) Assignee: Eastman Kodak Company, Rochester, NY (US)

( * ) Notice: Subject to any disclaimer, the term of this patent is extended or adjusted under 35 U.S.C. 154(b) by 112 days.

(21) Appl. No.: 10/285,098

(22) Filed: Oct. 31, 2002

(65) Prior Publication Data

US 2004/0084109 A1 May 6, 2004

(51) Int. Cl.[7] .................................................. B65B 1/04
(52) U.S. Cl. ................................. 141/384; 4/346; 4/349
(58) Field of Search ................................ 141/384, 383, 141/346, 349, 351, 347, 348, 350, 352, 353, 354, 355, 356, 357, 359, 18; 137/614.04; 251/149.1, 149.5; 222/501, 518, 325; 215/329, 228

(56) References Cited

U.S. PATENT DOCUMENTS

| | | | |
|---|---|---|---|
| 521,921 A | * | 6/1894 | Schifferly .................... 215/329 |
| 3,966,097 A | * | 6/1976 | Crown et al. ............. 222/402.2 |
| 4,380,310 A | | 4/1983 | Schneiter et al. |
| 4,916,797 A | * | 4/1990 | Strommen et al. ......... 29/426.5 |
| 5,293,913 A | * | 3/1994 | Preszler ....................... 141/346 |
| 5,425,528 A | * | 6/1995 | Rains et al. ............. 251/149.1 |
| 5,546,979 A | * | 8/1996 | Clark et al. .................. 141/346 |
| 5,560,405 A | | 10/1996 | Harris et al. |
| 5,577,614 A | | 11/1996 | Palmeroni, Jr. et al. |
| 5,694,991 A | | 12/1997 | Harris et al. |
| 6,079,444 A | | 6/2000 | Harris et al. |
| 6,149,129 A | | 11/2000 | Harris et al. |
| 6,354,564 B1 | * | 3/2002 | Van Scyoc et al. ..... 137/614.04 |

FOREIGN PATENT DOCUMENTS

DE    40 35 453    5/1992

* cited by examiner

Primary Examiner—Gregory L. Huson
Assistant Examiner—Khoa Huynh
(74) Attorney, Agent, or Firm—Frank Pincelli

(57) ABSTRACT

A cup and probe assembly for use in a system for transferring a liquid between two sources in a photographic processor. The probe having body portion having a threaded section that mates with a threaded inlet provided on said cup.

10 Claims, 5 Drawing Sheets

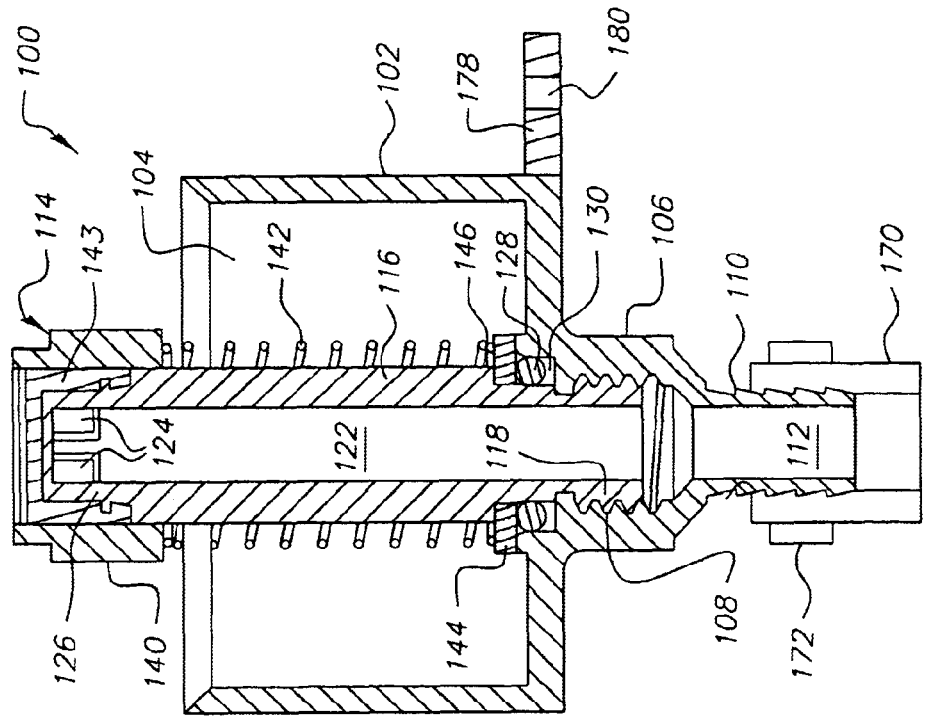
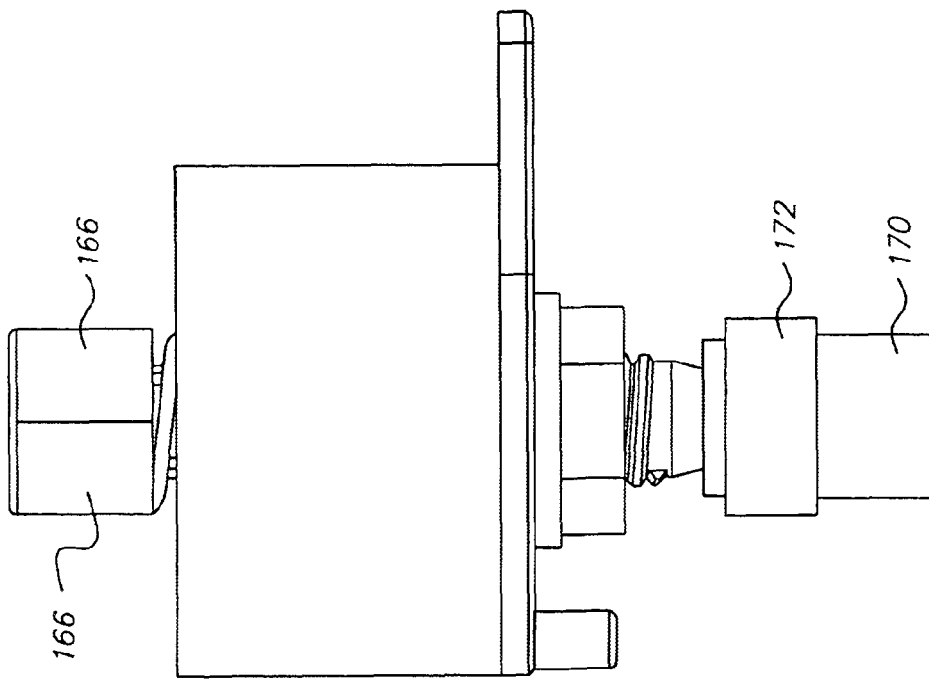
FIG. 4
FIG. 3

US 6,854,494 B2

CUP AND PROBE ASSEMBLY FOR USE IN A VALVE SYSTEM FOR TRANSFERRING A LIQUID BETWEEN TWO SOURCES

FIELD OF THE INVENTION

The present invention is directed to a cup and probe assembly designed to be used in a valve system primarily for transferring liquid from a container or other supply of liquid to a device for using the liquid.

BACKGROUND OF THE INVENTION

In photographic processors it is often necessary to provide replenishment solution to the processing liquid being used in the processor. In many situations, replenishment solution is provided in a container that is used in a replenishment system for delivering the replenishment solution in a predetermined manner to the appropriate processing tank. Because of the desire to minimize leaks and/or exposure to the environment of the replenishment solution, various dripless type assemblies have been suggested allowing connection and disconnection of the container containing the replenishment solution with the processor replenishment system. Examples of such valve assemblies are illustrated by U.S. Pat. Nos. 5,694,991 and 5,577,614. The valve assembly typically comprises a two part system, a first valve assembly of the valve system is typically associated with the container having the supply of replenishment solution to be provided to the processor, and a second valve assembly (also referred to as a probe) that is provided with the processor and is designed to mate with the first valve assembly allowing fluid to pass from the container to the replenishment system of the processor. These dripless valve assemblies minimize any leakage between connection and disconnection thereof. However, it has been found that there is a need to provide a cup around the valve assembly provided on the processor so as to capture leaks from the valve assembly that may occur. In addition, during long and repeated use of the valve assemblies, it has been found that it may be necessary to periodically change the second valve assembly provided on the processor. However, due to current construction, this is often a very difficult task and requires much labor including the need to remove air from the replenishment system provided on the processor.

Applicants have provided a new and improved cup and valve assembly that minimizes or eliminates the problem of the prior art. In particular, the cup and probe assembly provides a system whereby the probe can be quickly and easily changed and avoid the necessity of having to remove air from the replenishment system.

SUMMARY OF THE INVENTION

In accordance with the present invention there is provided a cup and probe assembly for use in a system for transferring a liquid between two sources in a photographic processor, comprising:

a cup member having an opening and an outlet section having a first threaded inlet section and an outlet section for connection to one of the sources, the inlet section and outlet section being in fluid communication by a first passageway;

a probe assembly that is one part of a two part valve assembly, the probe assembly having body portion having a second threaded section for mating with the first threaded inlet section.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIG. 3 is an elevational view of the assembled cup and valve assembly of FIG. 2;

FIG. 4 is a cross sectional view of the cup and probe assembly of FIG. 2;

DETAILED DESCRIPTION OF THE INVENTION

Figure 1A:
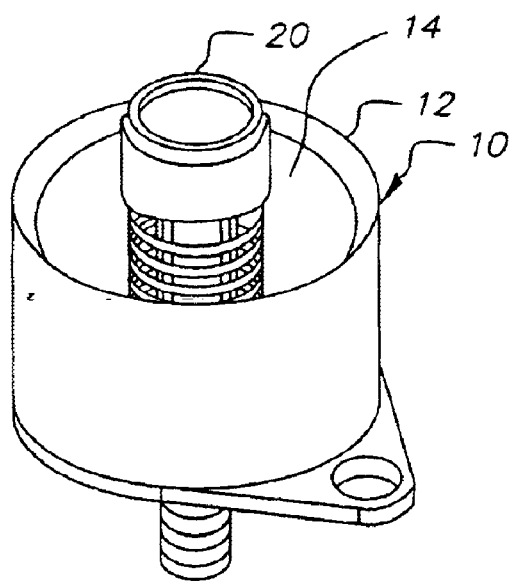
FIG. 1a is a perspective view of a cup and probe assembly which comprises one half of a dripless valve assembly in accordance with the prior art.
Figure 1C:
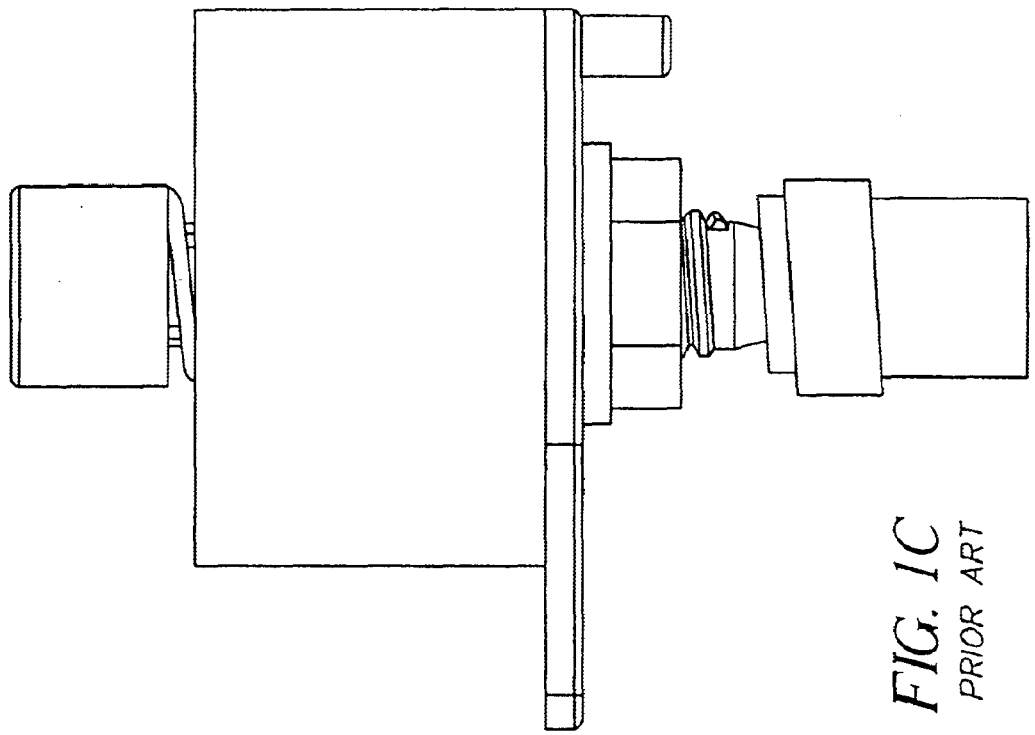
FIG. 1c is a cross sectional view of the cup and probe assembly of FIG. 1.
Figure 1B:
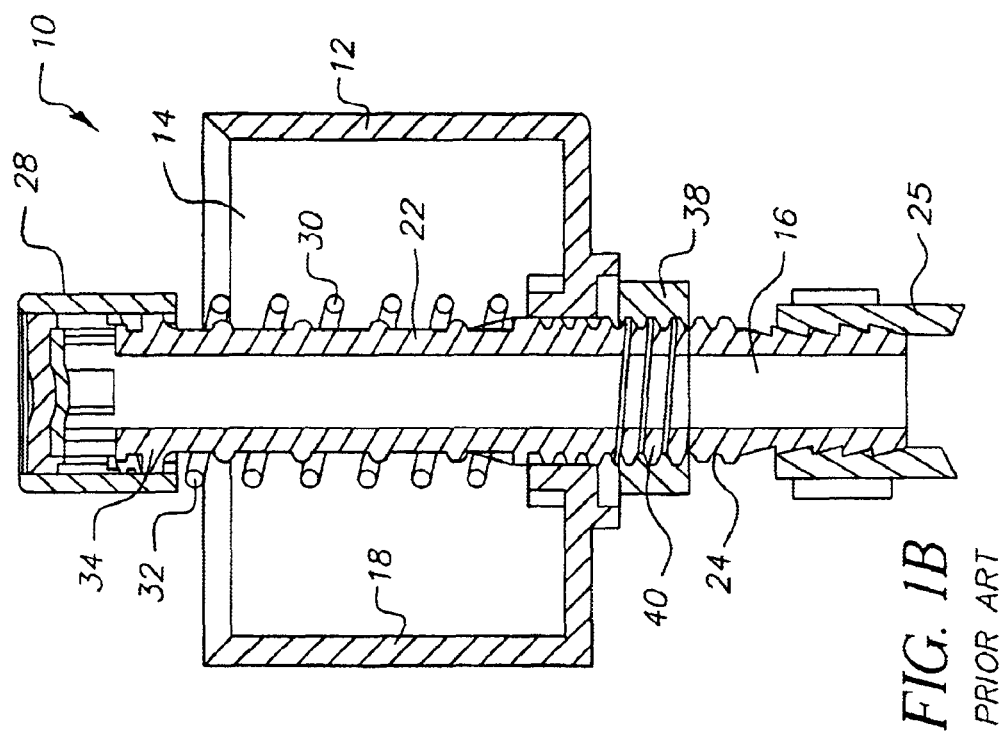
FIG. 1b is a cross elevational view of the cup and probe assembly of FIG. 1.
Figure 2:
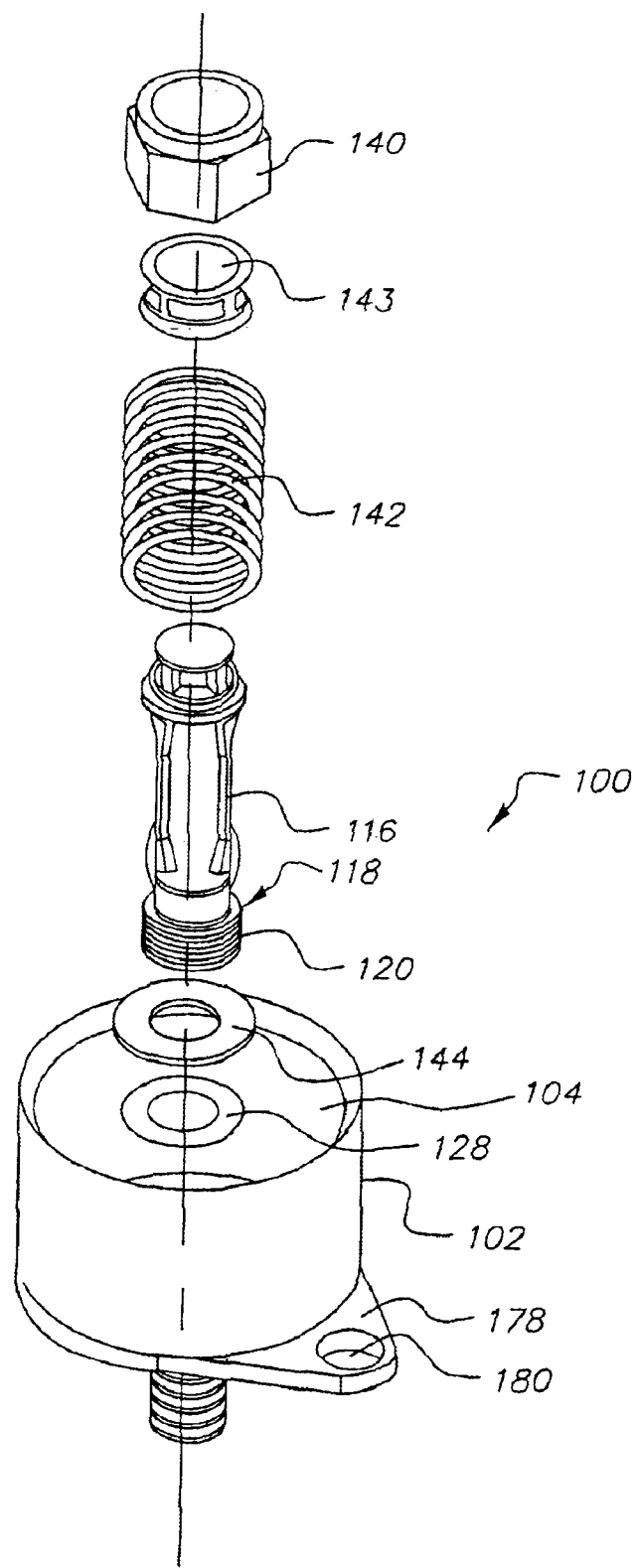
FIG. 2 is an exploded perspective view of the cup and probe assembly made in accordance with the present invention.

Referring to FIGS. 1a, 1b and 1c, there is illustrated a cup and probe assembly 10 made in accordance with the prior art. The cup and probe assembly 10 is mounted, for example, on a processor for processing photosensitive media such as photographic paper and/or film. The cup and probe assembly 10 comprises a cup 12 having an access opening 14 and an outlet opening 16 provided in the base 18. The probe assembly 20 comprises one half of a two part valve assembly of the type illustrated in U.S. Pat. No. 5,694,991 which is hereby incorporated by reference in its entirety. The probe assembly 20 includes a body 22 having lower end 24 that is secured to a replenishment supply system of a processor (see FIG. 8). The probe assembly 20 further includes a slidable cap member 28 that is biased upward by a spring 30. The cap member 28 includes projections 32 that engage a lip 34 formed at the upper end 36 of body 22. The lip 34 stops the cap member 28 from sliding off body 22. A threaded nut 38 is provided for engaging threaded section 40 on body 22 for securing body 22 to cup member 12. The replenishment supply system includes a connecting tube 42 which is clamped to the lower end 24 of probe body 22 by clamping member 44. The cup 12 is secured to the process by any desired means. In the embodiment illustrated, the cup and probe assembly 10 is secured to the process by securing mounting flange 48 to the processor by a fastening member (not shown), such as a screw, would pass through the opening 50 and engage a threaded recess in the processor. In the prior art when the probe assembly 20 was in need of replacement, it was necessary to substantially disassemble the cup and probe assembly 10 from the processor by disconnecting it from the replenishment system. This requires a substantial amount of labor in order to remove cup and probe assembly 10 and replace the probe assembly 20. Since the probe assembly 20 is directly connected to the replenishment system, this replacement would often result in substantial amounts of air entering the replenishment system through the connecting tube 25. In addition there would typically be a need to clean the cup member 12, probe assembly 20, and surrounding hardware of any residual chemistry that may have spilled.

Referring to FIGS. 2-6 there is illustrated a cup and probe assembly 100 made in accordance with the present invention. In particular, the cup and probe assembly 100 includes a cup 102 having an access opening 104 and an outlet section 106 having a threaded inlet section 108 and an outlet portion 110 for connection to a destination source such as the replenishment system of a typical photographic processor. The inlet section 108 is fluidly connected with the outlet portion 110 by passageway 112. The cup and probe assembly 100 further includes a probe assembly 114 that is one part of a two part valve assembly such as described in the '991 patent previously referred to herein. In the particular embodiment illustrated, the probe assembly 114 comprises a body portion 116 having a lower end 118 having an external threaded section 120 which is designed to mate with a threaded inlet section 108 of cup 102. The body portion 116 includes a passageway 122 which communicates with a plurality of inlet passages 124 at its upper end 126. The passageway 122 communicates with the passageway 112. The probe assembly 114 includes a sealing member 128 that is designed to engage a recess 130 provided in base 132 of cup 102. In the particular embodiment illustrated, sealing member 128 comprises a rubber O-ring. The probe assembly 114 further includes a cap member 140 which is slidable along body portion 116, a spring 142 and a retaining member 144 for retaining sealing member 128 in recess 130 and provides a surface against which the lower end 146 of spring 142 exerts a biasing force. The upper end 148 of spring 142 exerts a biasing force against cap member 140 so as to cover inlet passages 124 when the valve assembly is non engaged with respect to the other valve half (not shown). A sealing tip 143 is provided for providing a sealing engagement with the other mating half of the valve assembly (not shown).

Figure 6:
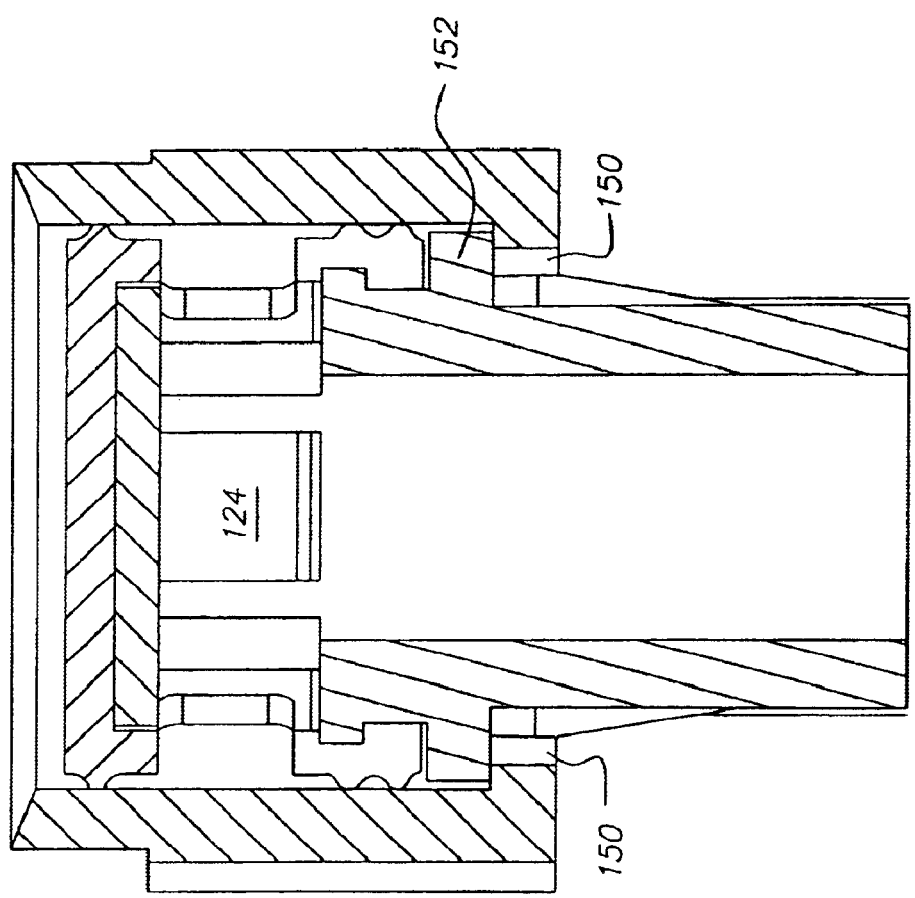
FIG. 6 is an enlarged partial view of the top portion of the body of FIG. 4.

As illustrated by FIG. 6, the cap member 140 has a plurality of lip members 150 which engage a rib/projection 152 on the outer surface 154 of body portion 116 for preventing the cap member 140 from sliding off body portion 116.

Figure 5:
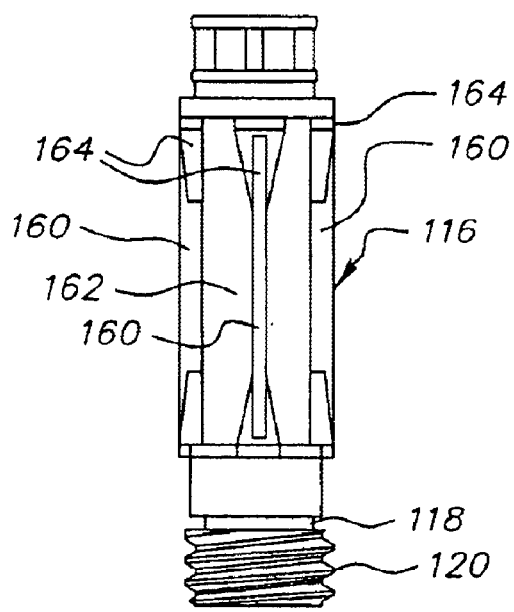
FIG. 5 is an elevational view of the body portion of the probe assembly of FIG. 4

Referring to FIG. 5, the outer surface 154 of body portion 116 is also provided with a plurality of longitudinal ribs 160 that form longitudinal passageways 162 which retains lip members 150 and guides the cap member 140 as it slides along body portion 116. The upper end 164 of longitudinal ribs 160 are reinforced and sized so that when cap member 140 is rotated, the lip members 150 will firmly engage upper end 164 of body portion 116 so that the body portion 116 can be screwed in or out of engagement with threaded inlet section 108 of cup 102. The distance between adjacent longitudinal ribs 160 is preferably such that the lateral sides of the lip member substantially abuts the two adjacent longitudinal ribs 160. Preferably the outer surface of cap member 140 is provided with a plurality of facets 166 (see FIG. 3) so as to allow the cap member 140 to be easily rotated by hand or through the use of a tool.

The lower end of outlet section 106 is connected to conduit 170 of the replenishment system of photographic processor. The conduit 170 in the particular embodiment is a plastic tube and is secured to the outlet portion 110 by an appropriate means which in the particular embodiment illustrated is a circular clamp 172. The cup 102 includes a mounting member 178 having an opening 180 used to mount the flange.

As can be seen, the probe assembly 114 is threadingly engaged to the cup member 102. Thus, probe assembly 114 is engaged or disengaged by simply unthreading the probe assembly 114. Since the probe assembly 114 is simply unthread from threaded inlet section 108, there is no chance of having air inadvertently entering the system as a result of changing of the probe assembly. Additionally, there is no need to disassemble the cup 102 from the processor or replenishment system as one simply manually, or through the use of the tool, unthreads the old probe assembly and inserts a new replaceable probe assembly.

The invention has been described in detail with particular reference to certain preferred embodiments thereof, but it will be understood that variations and modifications can be effected within the scope of the invention, the present invention being defined by the claims set forth herein.

Parts List 10 cup and probe assembly
12 cup member
14 access opening
16 outlet opening
18 base
20 probe assembly
22 body
24 lower end
25 connecting tube
26 mounting member
28 slidable cap member
30 spring
32 projections
34 lip
36 upperend
38 nut
40 threaded section
42 connecting tube
44 clamping member
48 mounting flange
50 opening
58 inlet section
60 outlet section
100 cup and probe assembly
102 cup
104 access opening
106 outlet section
108 inlet section
110 outlet portion
112 passageway
114 probe assembly
116 body portion
118 lower end
120 external threaded section
122 passageway
124 inlet passages
126 upper end
128 sealing member
130 recess
132 base
140 cap member
142 spring
143 sealing tip
144 retaining member
146 lower end
148 upperend
150 lip members
152 rib/projection
154 outer surface
160 longitudinal ribs
162 longitudinal passageway

164 upperend
166 facets
170 conduit
172 circular clamps
178 mounting member
180 opening

What is claimed is:

1. A cup and probe assembly for use in a system for transferring a liquid between two sources in a photographic processor, comprising:

a cup member having an opening and an outlet section having a first threaded inlet section and an outlet portion for connection to one of said sources, said inlet section and outlet section being in fluid communication by a first passageway;

a probe assembly that is one part of a two part valve assembly, said probe assembly having body portion having a second threaded section for mating with said first threaded inlet section, said probe assembly and said cup member forming an access opening there between, said body portion having a second passageway which fluidly communicates with a plurality of inlet passages and said first passageway in said cup, wherein said probe assembly further comprises a cap member that is slidably mounted to said body portion and a spring for biasing said cap member to cover said inlet passages.

2. A cup and probe assembly according to claim 1 wherein said first threaded inlet section is designed to be threadingly engaged with said second threaded section provided on the outer surface of said probe.

3. A cup and probe assembly according to claim 1 wherein said cup member has a recess for receiving a sealing member, a retaining member is provided for retaining said sealing member in said recess when said probe is secured to said cup member by said first and second threaded sections being threadingly engaged.

4. A cup and probe assembly according to claim 1 wherein said cap member has a plurality of lip members that engage a rib on the outer surface of said body member that restricts further movement of said cap member.

5. A cup and probe assembly according to claim 4 wherein said body member is provided with a plurality of longitudinal projections that form passageways in which said lip member move.

6. A cup and probe assembly according to claim 5 wherein said longitudinal projections are spaced apart at their upper end such that the lip member is firmly engaged between adjacent longitudinal projections.

7. A cup and probe assembly according to claim 6 wherein a plurality of facets are provided on the outer surface of said cap member.

8. A cup and probe assembly according to claim 1 wherein said cup member has a mounting member for mounting said cup member.

9. A cup and probe assembly according to claim 1 wherein said outlet section of said cup member is fluidly connected to a conduit of a replenishment system.

10. A cup and probe assembly according to claim 9 wherein a tube is secured to said outlet portion by a clamping member.

* * * * *